United States Patent [19]

Sawaya et al.

[11] Patent Number: 5,732,358
[45] Date of Patent: Mar. 24, 1998

[54] METHOD FOR SELECTING AN OPTIMAL BASE TRANSMITTER IN A RADIO COMMUNICATION SYSTEM

[75] Inventors: Samir A. Sawaya, Grapevine; Jyh-Han Lin, Keller, both of Tex.

[73] Assignee: Motorola, Inc., Schaumburg, Ill.

[21] Appl. No.: 676,848

[22] Filed: Jul. 8, 1996

[51] Int. Cl.⁶ .................. H04B 1/00; H04B 7/00
[52] U.S. Cl. .................. 455/525; 455/452; 455/456
[58] Field of Search ......................... 455/445, 450, 455/452, 453, 456, 443, 226.1, 503, 509, 524, 525, 526, 67.3, 69

[56] References Cited

U.S. PATENT DOCUMENTS

| | | | |
|---|---|---|---|
| 4,907,290 | 3/1990 | Crompton | 455/524 |
| 4,918,437 | 4/1990 | Jasinski | 340/825.44 |
| 5,042,083 | 8/1991 | Ichikawa | 455/526 |
| 5,047,762 | 9/1991 | Bruckert | 455/525 |
| 5,128,934 | 7/1992 | Jasinski | 340/825.44 |
| 5,162,790 | 11/1992 | Jasinski | 340/825.44 |
| 5,263,177 | 11/1993 | Schieve et al. | 455/525 |
| 5,410,732 | 4/1995 | Ames et al. | 455/525 |
| 5,423,059 | 6/1995 | Loglbo et al. | 455/525 |
| 5,499,386 | 3/1996 | Karlsson | 455/525 |

*Primary Examiner*—Reinhard J. Eisenzopf
*Assistant Examiner*—Marsha D. Banks-Harold
*Attorney, Agent, or Firm*—Eduardo Guntin; John H. Moore

[57] ABSTRACT

A communication system, including base transmitters (113) and base receivers (115) for transmitting and receiving messages to and from selective call transceivers (116), is used for selecting an optimal base transmitter (113) for transmitting messages to a selective call transceiver (116) that cannot identify its location within the communication system. The communication system selects an optimal base transmitter (113) having a highest of a plurality of probabilities for successfully transmitting a selective call message to the selective call transceiver (116) as a function of overlap between transmission coverage areas of the plurality of base transmitters (113) and a reception coverage area of the at least one base receiver (115) that received a negative acknowledge message from the selective call transceiver (116). After selecting the optimal base transmitter (113), the communication system causes the optimal base transmitter (113) to transmit the selective call message to the selective call transceiver (116).

30 Claims, 4 Drawing Sheets

METHOD FOR SELECTING AN OPTIMAL BASE TRANSMITTER IN A RADIO COMMUNICATION SYSTEM

FIELD OF THE INVENTION

This invention relates in general to two-way radio communication systems, and in particular to a two-way radio communication system employing frequency reuse.

BACKGROUND OF THE INVENTION

Currently, a two-way radio communication system (hereinafter referred to as communication system) sends simulcast query messages to selected portable transceivers in order to determine their locations. The portable transceivers, after receiving a query message from one or more transmitters, send a response message to the communication system identifying their locations in the communication system.

A portable transceiver determines its location by receiving a query message with a unique signature that identifies the transmitter that transmitted the query message. The signature is inserted by each transmitter prior to transmitting a query message. The portable transceiver decodes the signature and informs the radio communication system of the transmitter that transmitted the query message it received. This information is used by the radio communication system to determine the closest transmitter to the selected portable transceiver, hence determining the relative location of the portable transceiver.

Since query messages are transmitted on a simulcast frequency, there are instances when multiple transmitters will cause interference between transmitted query messages. This interference can result in unrecoverable corruption of a signature included in a query message, thereby making it impossible for a portable transceiver receiving such a message to identify the transmitter that sent the query message.

When this happens, the portable transceiver will respond with a negative acknowledgment message requesting retransmission of the query message. In metropolitan areas where the concentration of transmitter stations is high to account for heavy message traffic, retransmission of query messages may not resolve communication interference between multiple transmitters transmitting at close distances to each other. Portable transceivers which are located in environments where there is severe noise interference cannot receive query messages until the interference subsides, or the users of the portable transceivers move to another location where the interference is less substantial. This situation can result in message latencies that are inconsistent with customer expectations.

Thus, what is needed is a method and apparatus for selecting an optimal transmitter for sending messages to a portable transceiver when noise interference prevents the portable transceiver from informing the communication system of its location. The method and apparatus should also maintain system capacity as high as possible, while at the same time decreasing system noise interference.

DESCRIPTION OF THE PREFERRED EMBODIMENT

Figure 1:
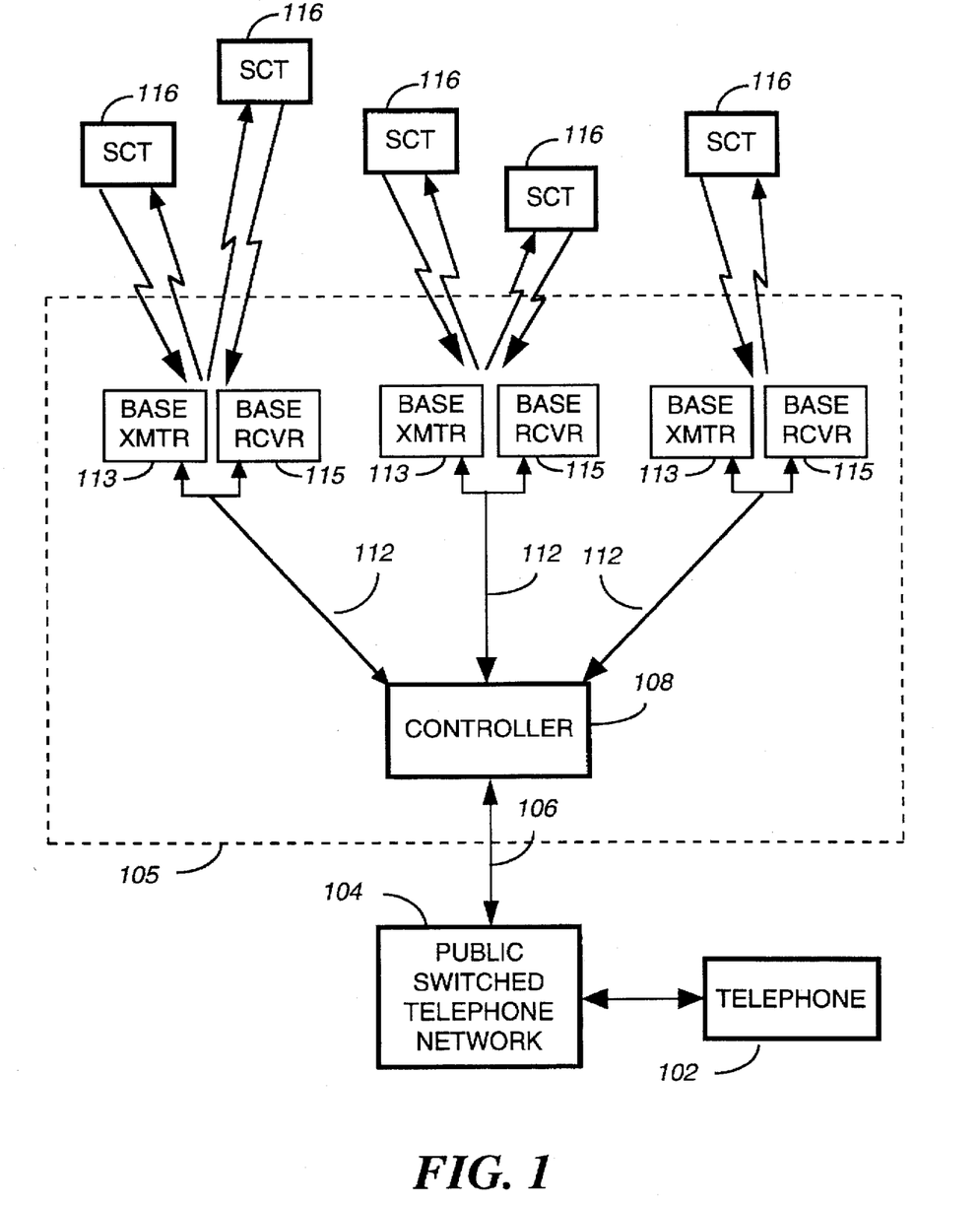
FIG. 1 is an electrical block diagram of a radio communication system.

FIG. 1 is an electrical block diagram of a radio communication system. The communication system comprises a fixed portion 105 that includes a plurality of base transmitters 113 and base receivers 115, and a controller 108. The base transmitters 113 and base receivers 115 are used for communicating messages to a plurality of SCTs 116 (selective call transceivers) using preferably conventional FM transmission means. It will be appreciated that alternatively, the base transmitters 113 and base receivers 115 can use AM transmission means alone or in combination with FM transmission means. It will be further appreciated that the base transmitters 113 and base receivers 115 are not necessarily co-located to each other.

Message exchanges between the fixed portion 105 and the SCTs 116 preferably conforms to the FLEX family of protocols (FLEX is a trademark of Motorola, Inc.). Preferably, the communication system uses the InFLEXion selective call signaling protocol (InFLEXion is a trademark of Motorola, Inc.) that is presently in use by various system operators in the United States. It will be appreciated that other communication protocols that are suitable to this invention such as, for example, the ReFLEX protocol (ReFLEX is a trademark of Motorola, Inc.) can be used. However, in the discussion below it is assumed that the InFLEXion protocol is used.

The controller 108 is coupled to a PSTN 104 (public switched telephone network) by way of one or more conventional telephone links 106 for receiving messages from callers using conventional telephone units 102. The controller 108 coordinates messages it receives from the PSTN 104, and sends such messages to the base transmitters 113 by way of conventional communication links 112.

In accordance with the present invention, the communication system is capable of communicating messages to the SCTs 116 in a heavily congested communication environment such as, for example, New York City. In such an environment, interference between base transmitters 113 is frequent and can at times cause problems that hinder effective communication with the SCTs 116.

This situation is especially crucial when the communication system transmits simulcast WRU (Where aRe yoU) messages to locate SCTs 116. Each WRU message includes a unique base transmitter signature to assist an SCT 116 in determining its location within the communication system relative to a base transmitter 113. The SCT 116 uses this information to inform the communication system of its location. Since WRU messages are transmitted on a simulcast frequency, there are instances when multiple base transmitters 113 will cause interference between transmitted WRU messages. This interference can result in unrecoverable corruption of one or more signatures received by an SCT 116, thereby making it impossible for the SCT 116 to identify its location. When this happens, the SCT 116 responds with a NACK (negative acknowledgment) message, which is received by at least one base receiver 115 in the communication system.

Knowing which base receivers 115 in the communication system received the NACK message, and the signal strength of the NACK message as received by the base receivers 115, the communication system determines an optimal base transmitter 113 having the highest probability of successfully transmitting a selective call message destined for the SCT 116 that responded with the NACK message (hereinafter referred to as the troubled SCT 116). In determining the highest probability, the communication system also accounts for the traffic load of each base transmitter 113 selected for the computation.

Once an optimal base transmitter 113 is selected, the communication system transmits a WTL (Where To Listen) message to the troubled SCT 116 followed by the selective call message. If the troubled SCT 116 cannot properly receive the selective call message, it responds by transmitting a second NACK message which includes a SQM (signal quality measurement) of the selective call message. The communication system uses the second NACK message as an additional criterion for calculating new probabilities for a select group of base transmitters 113 that have overlapping coverage areas with the base receivers 115 that received the second NACK message. The SQM information is used by the communication system to adjust frequency reuse plans and transmission power plans, and to gather historical information of interferences encountered in the communication system, and computes the solutions to overcome such interferences.

Figure 2:
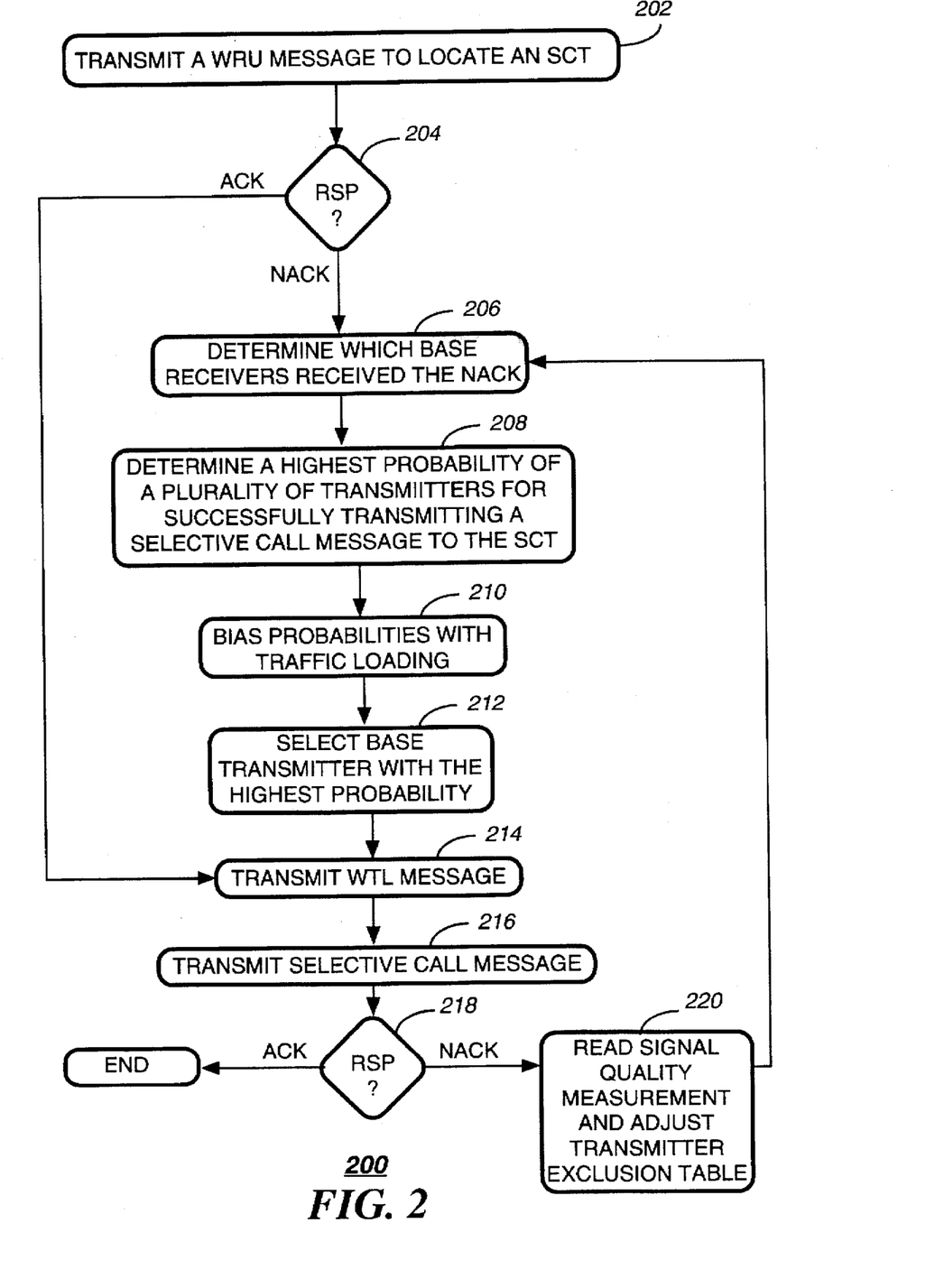
FIG. 2 is a flow chart depicting how the controller of FIG. 1 is programmed to operate according to the present invention.

FIG. 2 is a flow chart 200 depicting how the controller of FIG. 1 is programmed to operate according to the present invention. The flow chart 200 begins with step 202 where the controller 108 causes the base transmitters 113 to transmit a query message, representative of the WRU message, to locate an SCT 116. Prior to transmitting the WRU message, each base transmitter 113 inserts its own unique base transmitter signature into the WRU message, thereby providing the SCT 116 a means for determining its location relative to a closest base transmitter 113. In step 204, the controller 108 awaits a response message from the SCT 116.

If the base receivers 115 receive an ACK message from the SCT 116, the controller 108 proceeds to step 214 where it causes the base transmitters 113 to transmit a WTL message instructing the SCT to receive the selective call message on a specified frequency channel. The controller 108 then proceeds to step 216 where it causes the base transmitter 113 identified by the SCT 116 to transmit the selective call message according to a predetermined frequency reuse plan and transmission power plan. In step 218, the controller 108 awaits a response message from the SCT 116 verifying proper delivery of the selective call message. Upon receiving an ACK message from the SCT 116, the controller 108 ends message processing with the SCT 116.

There are instances, however, where message interference between base transmitters 113 transmitting WRU messages prevents an SCT 116 from properly decoding a unique base transmitter signature. When this happens, the troubled SCT 116 transmits a first NACK message which is received by at least one base receiver 115 (assume it is a plurality of base receivers 115 for illustration). The first NACK message is transmitted by the SCT 116 in response to failing to properly receive a unique base transmitter signature. The base receivers 115 demodulate the first NACK message sending a plurality of demodulated response messages to the controller 108.

The controller 108 proceeds to step 206 where it determines from the demodulated response message which base receivers 115 received the first NACK message, and also to determine the signal quality of the first NACK message as received by the base receivers 115. The signal quality measurement is preferably derived from one or more received signal strength indicators (RSSI) included in each base receiver 115. The RSSI is functionally similar to, for example, the MC13135 RSSI device manufactured by Motorola, Inc. It will be appreciated that, alternatively, the signal quality measurement is a data error rate measurement comprising either a symbol error rate or a bit error rate of the first NACK message as received by the base receivers 115.

In step 208, the controller 108 selects an optimal base transmitter 113 having a highest of a plurality of probabilities for successfully transmitting a selective call message to the troubled SCT 116. Each of the plurality of probabilities is computed for a corresponding one of a plurality of base transmitters 113. The plurality of probabilities are determined as a function of selected criteria that includes, but is not limited to, a percentage of overlap between transmission coverage areas of the plurality of base transmitters 113 and reception coverage areas of the base receivers 115 that received the first NACK message. The percentage of overlap is preferably determined by a prediction model, which the controller 108 is programmed to implement. It will be appreciated that, alternatively, the percentages of overlap are predetermined from field measurements made of the base transmitters 113 in the communication system. Such measurements would be prestored in a memory of the controller 108. The selected criteria also includes the signal strength measurements made by the base receivers 115.

To determine a percentage of overlap between the coverage area of a base receiver 115, and the coverage area of a base transmitter 113, the controller 108 subdivides the respective coverage areas into grids. The controller 108 then determines a percentage of overlap by counting the percentage of grids that overlap between the reception coverage area of the base receiver 115 and the transmission coverage area of the base transmitter 113. In computing the plurality of probabilities, the controller 108 selects those base transmitters 113 whose coverage areas overlap with the coverage areas of the base receivers 115 that received the first NACK message. Once the percentages of overlap have been determined, the controller 108 determines each probability for a selected base transmitter 113 from a weighted average of the percentages of overlap between the base transmitter 113 and the base receivers 115 that received the first NACK message.

The weighted average is preferably based on the signal strength of the first NACK message measured by each base receiver 115, and follows the expression $$PS(Tx_i) = \frac{\sum_{j=1}^{n} W_j \cdot PO(Tx_{ij})}{\sum_{j=1}^{n} W_j},$$

wherein $PS(Tx_i)$ is the probability that a base transmitter 113, identified by subscript "i," will successfully transmit a selective call message to the troubled SCT 116. The variable $W_j$ represents a signal strength measurement of a base receiver 115, identified by the subscript "j," that received the first NACK message. Each weight $W_j$ is preferably normalized between 0 and 1. It will be appreciated that, alternatively, the weights are based on data error rate measurements of the first NACK message measured by the base receivers 115, the data error rate measurements comprising either symbol error rate or bit error rate measurements of the first NACK message. Moreover, each weight is inversely proportional to the data error rate measurement, and is normalized between 0 and 1.

Assuming "n" base receivers 115 received the first NACK message, the equation above identifies those base receivers 115 by the subscript j indexed as "1, 2, 3, ... n." The variable $PO(Tx_{ij})$ represents the percentage of overlap between a base transmitter 113 $Tx_i$ whose coverage area overlaps with one of the base receivers 115 who received the first NACK message.

Hence, the probability that a base transmitter 113 $Tx_i$ can successfully transmit a selective call message to the SCT 116 is computed from a weighted average of percentages of overlapping coverage areas between the base transmitter 113 $Tx_i$ and the base receivers 115 that received the first NACK message, weighted by the signal strength measured by the respective base receivers 115. The communication system computes for each base transmitter 113 in the communication system that has a transmission coverage area that overlaps with one or more base receivers 115 that received the first NACK message a probability for transmitting the selective call message.

After determining the plurality of probabilities, the controller 108, in step 210, weights each probability by one of a plurality of bias factors. Each bias factor is preferably a function of a level of communication activity for a corresponding one of the plurality of base transmitters 113. The level of communication activity for a base transmitter 113 is determined from its historical accumulation of levels of communication activity. For example, the level of communication activity of a base transmitter 113 is determined from the number of messages transmitted and received by the base transmitter 113 over a time span of one month. The application of the bias factor to a base transmitter 113 probability results in the expression $$BP(Tx_i) = PS(Tx_i) \cdot BF(Tx_i),$$

wherein $BP(Tx_i)$ is the probability computed for the base transmitter 113 $Tx_i$ biased by its traffic load. The variable $BF(Tx_i)$ is the bias factor for base transmitter 113 $Tx_i$, and preferably follows the expression $$BF(Tx_i) = \left(1 - \frac{\text{Population\_Served\_by\_}Tx_i}{\text{Population\_Served\_by\_All\_Transmitters}}\right).$$

The equation for the bias factor $BF(Tx_i)$ is designed to lower the value of the probability $PS(Tx_i)$ when the base transmitter 113 $Tx_i$ has a high-level of communication activity, and raise the value of the probability $PS(Tx_i)$ when the base transmitter 113 $Tx_i$ has a low-level of communication activity. If the population of SCTs 116 served by base transmitter 113 $Tx_i$ is high in comparison to the total population of SCTs 116 served by all the base transmitters 113 in the communication system, then the equation for the bias factor $BF(Tx_i)$ will compute to a low value. The opposite is true when the population served by the base transmitter 113 $Tx_i$ is low in comparison to the total population of SCTs 116 served by all the base transmitters 113 in the communication system.

Hence, the bias factor is assigned a low value when its corresponding base transmitter 113 has a high-level of communication activity, and a high value when its corresponding base transmitter 113 has a low-level of communication activity. This approach helps to balance the transmission load amongst the population of probable base transmitters 113 that can transmit the selective call message to the troubled SCT 116.

Once the controller 108 has taken into account traffic conditions of the probable base transmitters 113 by applying corresponding bias factors, the controller 108 proceeds to step 212 where it selects the optimal base transmitter 113 with the highest probability. In step 214, the controller 108 causes the base transmitters 113 of the communication system to transmit simulcast a WTL message to the troubled SCT 116. The controller 108 then proceeds to step 216 where it causes the optimal base transmitter 113 to transmit the selective call message to the troubled SCT 116 according to a selected frequency reuse plan.

In step 218, the controller 108 awaits a response message from the troubled SCT 116. After receiving an ACK message from the troubled SCT 116, the controller 108 ends message processing with the troubled SCT 116. If, however, a second NACK message is received from the troubled SCT 116 indicating that it could not properly receive the selective call message, the controller 108 proceeds to step 220 where it reads a signal quality measurement included in the second NACK message and adjusts a transmitter exclusion table according to the signal quality measurement. The signal quality measurement is representative of the signal quality of the selective call message measured by the troubled SCT 116.

The signal quality measurement of the selective call message is preferably a signal-to-interference measurement. It will be appreciated that, alternatively, the signal quality measurement is a data error rate measurement comprising either a symbol error rate or bit error rate measurement of the selective call message.

To further improve the probability of retransmitting the selective call message successfully, the controller 108 utilizes the signal-to-interference measurement included in the second NACK message to adjust the frequency reuse plan used by the communication system in step 216. The signal-to-interference measurement is used by the controller 108 to select a frequency reuse plan that minimizes the interference experienced by the troubled SCT 116. This information is used by the controller 108 to gather historical data on interferences encountered in the communication system, thereby avoiding such interferences in future communications to the SCTs 116. The selection of the frequency reuse plan includes dynamically allocating transmission channels of each base transmitter 113 as well as adjusting transmission power of each base transmitter 113 according to the signal-to-interference measurement so as to minimize interference with the optimal base transmitter 113.

The process of dynamically allocating transmission channels is done by adjusting a transmitter exclusion table, in response to the signal-to-interference measurement made by the troubled SCT 116. The controller 108 is programmed to adjust the transmitter exclusion table by computing a percentage of interference between two base transmitters 113. Prior to determining the percentage of interference, the controller 108 subdivides the coverage area of base transmitter 113 $Tx_i$ into grids. The controller 108 then computes the percentage of interference from the number of grids in the coverage area of base transmitter 113 $Tx_i$ that do not meet a minimum signal-to-interference level when base transmitter $Tx_j$ is on, divided by the total number of grids in the coverage area of the base transmitter 113 $Tx_i$. The minimum signal-to-interference level is preferably predetermined by the controller 108 as the minimum signal-to-interference level accepted for successfully transmitting a selective call message to the troubled SCT 116.

A detailed description of exclusion transmitter tables is more fully described in application Ser. No. 08/476,771 filed Jun. 7, 1995 by Wang, entitled "Method and Apparatus for Scheduling Message Traffic in a Multicell Radio Communication System," which is incorporated herein by reference.

The second NACK message is also used by the controller 108 as an additional criterion for computing the plurality of probabilities in step 208. In step 208, the controller 108 receives signal quality measurements from the base receivers 115 that received the second NACK message. The signal quality measurements are representative of the signal quality of the second NACK message, and preferably comprise signal strength measurements. The signal strength measurements are substantially the same measurements described earlier for the first NACK message, and are used for calculating the weighted average of percentages of overlap for each base transmitter 113. Alternatively, the signal quality measurements are data error rate measurements of the second NACK message.

Receiving ACK and NACK messages is used by the controller 108 as criteria for adjusting the computation of the plurality of probabilities computed in step 208. In particular, the percentage of overlap function is adjusted such that the probability function described above follows the new expression $$PS(Tx_i, H_{ij}) = \frac{\sum_{j=1}^{n} W_j \cdot PO(Tx_{ij}, H_{ij})}{\sum_{j=1}^{n} W_j},$$

wherein the percentage of overlap is now also a function of a historical factor $H_{ij}$. The historical factor $H_{ij}$ accounts for the successes and failures of associating a base transmitter 113 designated by the subscript "i" with a base receiver 115 designated by the subscript "j." If, for example, the controller 108 uses a prediction model that determines that a coverage area overlap between a selected base transmitter 113 and base receiver 115 is 90%, but the success rate of associating the selected base transmitter 113 and base receiver 115 is 60% (i.e., communication system receives ACK messages 60% of the time), then the controller 108 will adjust the percentage of overlap in a manner that provides less weight to that association. In one embodiment, the historical factor $H_{ij}$ is multiplied with the percentage of overlap. It follows then from the example above that the overlap percentage originally calculated to be 90% becomes 54% when applying the historical factor $H_{ij}$.

Note that for high success rates (e.g., 100% return of ACK messages), the historical factor $H_{ij}$ is preferably increased beyond 100%. This is to account for inaccuracies in prediction models used by the controller 108 for calculating overlap percentages. For example, a prediction model can erroneously estimate an overlap percentage of 10% for a selected base transmitter 113 and base receiver 115. If the success rate of associating the selected base transmitter 113 and the base receiver 115 is shown to be 100% over 100 attempts, then the controller 108 can select, for example, a historical factor $H_{ij}$ of 1000%. This results is derived from doubling the percentage rate every 10 attempts, i.e., 100% for 10 successful attempts, 200% for the 20 successful attempts, and so on.

For failures, on the other hand, the historical factor $H_{ij}$ follows a steeper rate of decline. For example, a historical factor $H_{ij}$ at 200%, after 20 successful attempts, can be decreased by 20% for each failed attempt thereafter. If the 21st attempt fails, the historical factor $H_{ij}$ is decreased to 180%. If the 22nd attempt fails, the historical factor $H_{ij}$ is decreased to 160%, and so on. Hence a historical accumulation of successes and failures of messages transmitted to troubled SCT 116 helps to improve the prediction model used by the controller 108, thereby substantially improving the overall success rate of transmitting messages to troubled SCTs 116 that cannot properly receive selective call messages.

Figure 3:
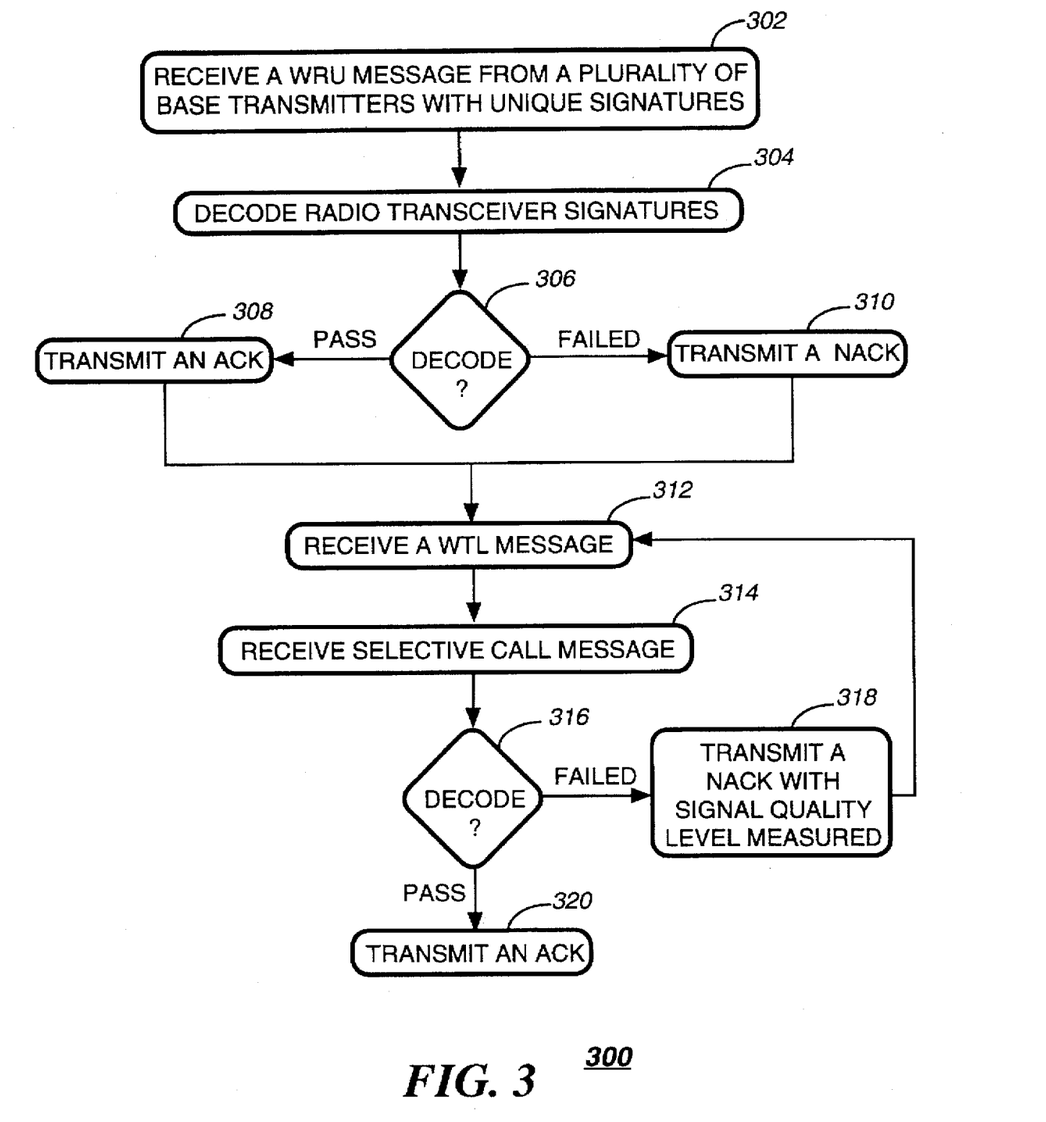
FIG. 3 is a flow chart depicting how a selective call transceiver of FIG. 1 is programmed to operate according to the present invention.

FIG. 3 is a flow chart 300 depicting how an SCT 116 of FIG. 1 is programmed to operate according to the present invention. The flow chart 300 begins with step 302 where the SCT 116 receives a WRU message from a plurality of base transmitters 113 with unique signatures. In step 304, the SCT 116 decodes the signatures in a conventional manner. The SCT 116 determines in step 306 whether the decoding process was successful. If it was, the SCT 116 proceeds to step 308 where it transmits an ACK message to the communication system. If, however, the SCT 116 cannot decode any transmitter signatures, because of interference between base transmitter 113 as described above, the SCT 116 proceeds to step 310 where it transmits a first NACK message to the communication system.

In both cases, the SCT 116 proceeds to step 312 where it receives a WTL message from the communication system instructing it to receive the selective call message on a selected frequency channel. In the case where the SCT 116 transmits a first NACK message, step 312 presumes that the communication system has selected an optimal base transmitter 113 for transmitting the selective call message in accordance with the flow chart 200 described above. In step 314, the SCT 116 receives the selective call message and decodes it in a conventional manner. The SCT 116 determines in step 316 whether the selective call message was decoded successfully. If it was, the SCT 116 transmits an ACK message in step 320.

If it was not, the SCT 116, in step 318, transmits a second NACK message to the communication system including a signal quality level measurement of the received selective call message. The signal quality measurement is preferably a signal-to-interference measurement representative of, for example, co-channel and adjacent channel interference. The SCT 116 then proceeds to step 312 where it awaits a retransmission of the selective call message from the communication system.

Figure 4:
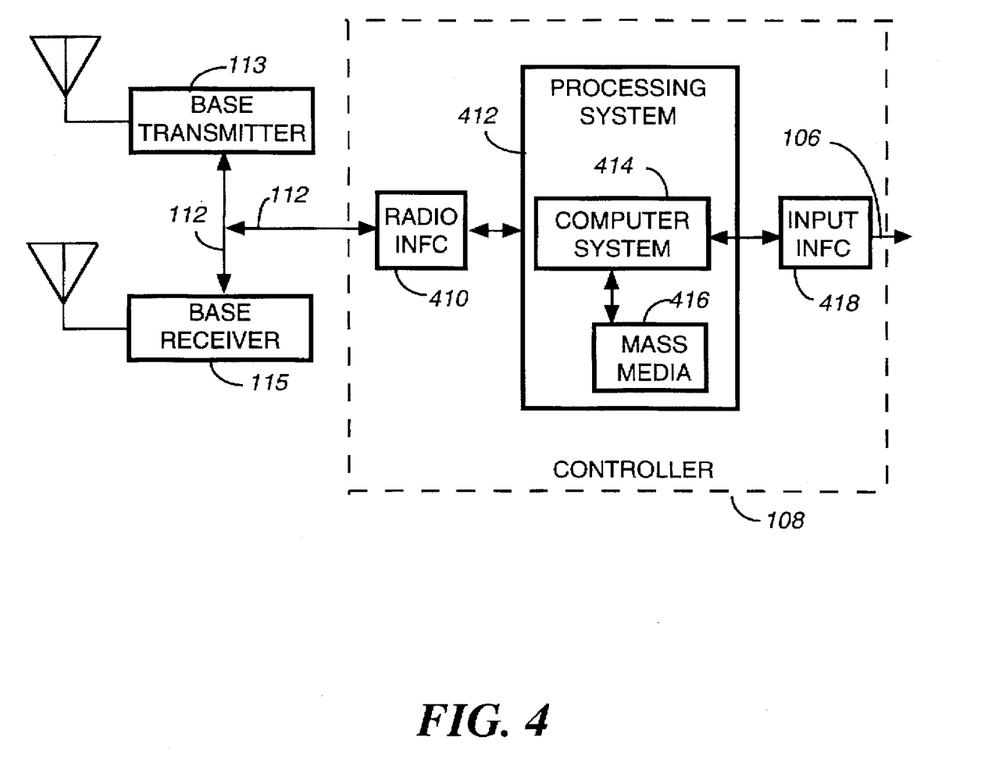
FIG. 4 is an electrical block diagram of a controller and a single base transmitter and base receiver for illustration purposes.

FIG. 4 is an electrical block diagram of the controller 108 and a single base transmitter 113 and base receiver 115 for illustration purposes. It will be appreciated that, normally, the controller 108 is coupled to a plurality of base transmitters 113 and a plurality of base receivers 115 as shown in FIG. 1. The controller 108 includes a processing system 412, an input interface 418, and a radio interface 410. The hardware elements of the controller 108 are preferably a combination of the Wireless Messaging Gateway (WMG™) Administrator! paging terminal, and the RF-Conductor!™ message distributor manufactured by Motorola, Inc. It will be appreciated that other similar hardware can be used for the controller 108.

The processing system 412 is used for directing operation of the controller 108. To accomplish this task, the processing system 412 includes a conventional computer system 414 and a conventional mass storage media 416. The computer system 414 is programmed by software stored in the mass storage media 416. The software is programmed in accordance with the flow chart 200 of FIG. 2. The input interface 418 is coupled to the processing system 412 by way of the telephone link 106 for receiving messages from the PSTN 104. The radio interface 410 is coupled to the processing system 412 for sending and receiving messages thereto and therefrom the base transmitter 113 and base receiver 115, respectively.

The base transmitter 113 and base receiver 115 are coupled to the processing system 412 for transmitting messages to SCTs 116 and for receiving responses from the SCTs 116. The hardware of the base transmitters 113 and base receivers 115, respectively, is preferably a combination of the Nucleus® Orchestra! transmitter and RF-Audience!™ receivers manufactured by Motorola, Inc. It will be appreciated that other similar hardware can be used for the base transmitters 113 and base receivers 115.

The base transmitter 113 transmits messages to SCTs 116 using conventional FM transmission means such as, for example, frequency shift keyed FM. The base receiver 115 receives messages from SCTs 116 using conventional means for receiving FM signals. Messages received from SCTs 116 are communicated to the radio interface 410, which in turn relays the messages to the processing system 412. The base transmitter 113 and the base receiver 115 are preferably not co-located in order reduce noise interference between them.

The present invention provides a novel method and apparatus for selecting an optimal base transmitter 113 for transmitting messages to an SCT 116 when noise interference prevents the SCT 116 from informing the communication system of its location. In particular, the controller 108 of the communication system determines an optimal base transmitter 113 for transmitting a selective call message to the troubled SCT 116 from selected criteria comprising: signal strength measurements made by the base receivers 115 that received the first NACK message, percentages of overlap between coverage areas of the base transmitters 113 and the base receivers 115, signal quality measurements made by SCTs 116 that fail to receive the selective call message, and historical data consisting of successful and failed attempts to transmit the selective call message from the optimal base transmitter 113.

The historical data used by the controller 108 helps to improve the prediction model for selecting an optimal base transmitter 113. The signal quality measurements provides an additional criterion that the controller 108 can use to help reduce noise interference in the communication system. The capability to dynamically adjust the prediction model for determining an optimal base transmitter 113, along with the capability to dynamically adjust frequency reuse plans and power transmission plans, helps to maintain system capacity of the communication system as high as possible, while at the same time decreasing system noise interference.

What is claimed is:

1. In a radio communication system that includes base transmitters for transmitting messages to selective call transceivers within transmission coverage areas, and base receivers for receiving messages from selective call transceivers within reception coverage areas, a method for selecting an optimal base transmitter for transmitting messages to a selective call transceiver, comprising:

transmitting from a plurality of base transmitters a query message to locate the selective call transceiver, wherein each base transmitter transmits the query message with its own unique base transmitter signature;

receiving a negative acknowledgment message by at least one base receiver, wherein the negative acknowledgment message is transmitted by the selective call transceiver in response to failing to properly receive a unique base transmitter signature;

selecting an optimal base transmitter having a highest of a plurality of probabilities for successfully transmitting a selective call message to the selective call transceiver, each of the plurality of probabilities being computed for a corresponding one of a plurality of base transmitters, and wherein the plurality of probabilities are determined as a function of overlap between transmission coverage areas of the plurality of base transmitters and a reception coverage area of the at least one base receiver; and transmitting the selective call message from the optimal base transmitter.

2. A method as set forth in claim 1, wherein each probability is weighted by one of a plurality of bias factors, wherein each bias factor is a function of a level of communication activity for a corresponding one of the plurality of base transmitters.

3. A method as set forth in claim 2, wherein the level of communication activity for a base transmitter is determined from its historical accumulation of levels of communication activity.

4. A method as set forth in claim 2, wherein a bias factor is assigned a low value when its corresponding base transmitter has a high-level of communication activity, and a high value when its corresponding base transmitter has a low-level of communication activity.

5. A method as set forth in claim 1, wherein the function of overlap is determined from a percentage of overlap between transmission coverage areas of the plurality of base transmitters and the reception coverage area of the at least one base receiver.

6. A method as set forth in claim 5, wherein each probability is determined as a weighted average of the percentage of overlap.

7. A method as set forth in claim 6, wherein the weighted average is a function of at least one quality measurement representative of signal quality of the negative acknowledgment message as received by the at least one base receiver.

8. A method as set forth in claim 1, wherein the selective call message is transmitted by the optimal base transmitter using a frequency reuse plan that includes dynamically allocating transmission channels of each base transmitter so as to minimize interference with the optimal base transmitter.

9. A method as set forth in claim 8, wherein dynamically allocating transmission channels is done by adjusting a transmitter exclusion table.

10. A method as set forth in claim 1, wherein the selective call message is transmitted by the optimal base transmitter using a frequency reuse plan that includes adjusting transmission power of each base transmitter so as to minimize interference with the optimal base transmitter.

11. In a radio communication system that includes base transmitters for transmitting messages to selective call transceivers within transmission coverage areas, and base receivers for receiving messages from selective call transceivers within reception coverage areas, a method for selecting an optimal base transmitter for transmitting messages to a selective call transceiver, comprising:

transmitting from a plurality of base transmitters a query message to locate the selective call transceiver, wherein each base transmitter transmits the query message with its own unique base transmitter signature;

receiving a negative acknowledgment message by at least one base receiver, wherein the negative acknowledgment message is transmitted by the selective call transceiver in response to failing to properly receive a unique base transmitter signature;

selecting an optimal base transmitter having a highest of a plurality of probabilities for successfully transmitting a selective call message to the selective call transceiver, each of the plurality of probabilities being computed for a corresponding one of a plurality of base transmitters, and wherein the plurality of probabilities are determined as a function of a weighted average of a percentage of overlap between transmission coverage areas of the plurality of base transmitters and a reception coverage area of the at least one base receiver; and transmitting the selective call message from the optimal base transmitter.

12. In a radio communication system that includes base transmitters for transmitting messages to selective call transceivers within transmission coverage areas, and base receivers for receiving messages from selective call transceivers within reception coverage areas, a method for selecting an optimal base transmitter for transmitting messages to a selective call transceiver, comprising:

transmitting from a plurality of base transmitters a query message to locate the selective call transceiver, wherein each base transmitter transmits the query message with its own unique base transmitter signature;

receiving a negative acknowledgment message by at least one base receiver, wherein the negative acknowledgment message is transmitted by the selective call transceiver in response to failing to properly receive a unique base transmitter signature;

selecting an optimal base transmitter having a highest of a plurality of probabilities for successfully transmitting a selective call message to the selective call transceiver, each of the plurality of probabilities being computed for a corresponding one of a plurality of base transmitters, wherein each probability is determined as a function of overlap between transmission coverage areas of the plurality of base transmitters and a reception coverage area of the at least one base receiver, and as a function of a level of communication activity for each base transmitter; and transmitting the selective call message from the optimal base transmitter.

13. In a radio communication system that includes base transmitters for transmitting messages to selective call transceivers within transmission coverage areas, and base receivers for receiving messages from selective call transceivers within reception coverage areas, a method for selecting an optimal base transmitter for transmitting messages to a selective call transceiver, comprising:

(a) transmitting from a plurality of base transmitters a query message to locate the selective call transceiver, wherein each base transmitter transmits the query message with its own unique base transmitter signature;

(b) receiving a first negative acknowledgment message by at least one base receiver in response to a selective call transceiver failing to properly receive a unique base transmitter signature;

(c) selecting an optimal base transmitter having a highest of a plurality of probabilities for successfully transmitting a selective call message to the selective call transceiver, each of the plurality of probabilities being computed for a corresponding one of a plurality of base transmitters, and wherein the plurality of probabilities are determined as a function of selected criteria;

(d) transmitting the selective call message from the optimal base transmitter;

(e) receiving a second negative acknowledgment message by at least one base receiver in response to the selective call transceiver failing to properly receive the selective call message, wherein the second negative acknowledgment message includes a signal quality measurement of the selective call message; and (f) repeating steps (c) and (d), wherein step (c) uses the signal quality measurement as an additional criterion for computing the plurality of probabilities.

14. A method as set forth in claim 13, wherein the function of selected criteria is a function of overlap between transmission coverage areas of the plurality of base transmitters and a reception coverage area of the at least one base receiver.

15. A method as set forth in claim 14, wherein each probability is determined as a weighted average of function of overlap.

16. A method as set forth in claim 15, wherein the weighted average is a function of the signal quality measurement of the selective call message.

17. A method as set forth in claim 15, wherein the weighted average is a function of the signal quality measurement of the selective call message, and is a function of at least one signal quality measurement representative of signal quality of the second negative acknowledgment message as received by the at least one base receiver.

18. A method as set forth in claim 15, wherein the weighted average is a function of at least one signal quality measurement representative of signal quality of the first negative acknowledgment message as received by the at least one base receiver.

19. A method as set forth in claim 14, wherein the function of overlap is determined from a percentage of overlap between transmission coverage areas of the plurality of base transmitters and the reception coverage area of the at least one base receiver.

20. A radio communication system that selects an optimal base transmitter for transmitting messages to a selective call transceiver when noise interference prevents the selective call transceiver from informing the radio communication system of its location, comprising:

a plurality of base transmitters for transmitting messages to selective call transceivers within transmission coverage areas;

a plurality of base receivers for receiving messages from selective call transceivers within reception coverage areas;

a controller comprising:

a processing system, coupled to the plurality of base transmitters and coupled to the plurality of base receivers, for controlling operation of the controller, wherein the processing system is programmed to:

cause the plurality of base transmitters to transmit a query message to locate the selective call transceiver, wherein each base transmitter transmits the query message with its own unique base transmitter signature;

receive at least one demodulated response message from at least one base receiver representative of a negative acknowledgment message, wherein the negative acknowledgment message is transmitted by the selective call transceiver in response to failing to properly receive a unique base transmitter signature;

select an optimal base transmitter having a highest of a plurality of probabilities for successfully transmitting a selective call message to the selective call transceiver, each of the plurality of probabilities being computed for a corresponding one of a plurality of base transmitters, and wherein each probability is determined as a function of overlap between transmission coverage areas of the plurality of base transmitters and a reception coverage area of the at least one base receiver; and cause the optimal base transmitter to transmit the selective call message to the selective call transceiver.

21. A radio communication system as set forth in claim 20, wherein each probability is weighted by one of a plurality of bias factors, wherein each bias factor is a function of a level of communication activity for a corresponding one of the plurality of base transmitters.

22. A radio communication system as set forth in claim 21, wherein the level of communication activity for a base transmitter is determined from its historical accumulation of levels of communication activity.

23. A radio communication system as set forth in claim 21, wherein a bias factor is assigned a low value when its corresponding base transmitter has a high-level of communication activity, and a high value when its corresponding base transmitter has a low-level of communication activity.

24. A radio communication system as set forth in claim 20, wherein the function of overlap is determined from a percentage of overlap between transmission coverage areas of the plurality of base transmitters and the reception coverage area of the at least one base receiver.

25. A radio communication system as set forth in claim 24, wherein each probability is determined as a weighted average of the percentage of overlap.

26. A radio communication system as set forth in claim 25, wherein the weighted average is a function of at least one signal quality measurement representative of signal quality of the negative acknowledgment message as received by the at least one base receiver.

27. A radio communication system as set forth in claim 20, wherein the selective call message is transmitted by the optimal base transmitter using a frequency reuse plan that includes dynamically allocating transmission channels of each base transmitter so as to minimize interference with the optimal base transmitter.

28. A radio communication system as set forth in claim 27, wherein dynamically allocating transmission channels is done by adjusting a transmitter exclusion table.

29. A radio communication system as set forth in claim 20, wherein the selective call message is transmitted by the optimal base transmitter using a frequency reuse plan that includes adjusting transmission power of each base transmitter so as to minimize interference with the optimal base transmitter.

30. A radio communication system that selects an optimal base transmitter for transmitting messages to a selective call transceiver when noise interference prevents the selective call transceiver from informing the radio communication system of its location, comprising:

a plurality of base transmitters for transmitting messages to selective call transceivers within transmission coverage areas;

a plurality of base receivers for receiving messages from selective call transceivers within reception coverage areas;

a controller comprising:

a processing system, coupled to the plurality of base transmitters and coupled to the plurality of base receivers, for controlling operation of the controller, wherein the processing system is programmed to:

(a) cause the plurality of base transmitters to transmit a query message to locate the selective call transceiver, wherein each base transmitter transmits the query message with its own unique base transmitter signature;

(b) receive at least one demodulated response message from at least one base receiver representative of a first negative acknowledgment message, wherein the first negative acknowledgment message is transmitted by the selective call transceiver in response to failing to properly receive a unique base transmitter signature;

(c) select an optimal base transmitter having a highest of a plurality of probabilities for successfully transmitting a selective call message to the selective call transceiver, each of the plurality of probabilities being computed for a corresponding one of a plurality of base transmitters, and wherein the plurality of probabilities are determined as a function of selected criteria;

(d) cause the optimal base transmitter to transmit the selective call message to the selective call transceiver;

(e) receive at least one demodulated response message from at least one base receiver representative of a second negative acknowledgment message, wherein the second negative acknowledgment message is transmitted by the selective call transceiver in response to failing to properly receive the selective call message, and wherein the second negative acknowledgment message includes a signal quality measurement of the selective call message; and (f) repeat steps (c) and (d), wherein step (c) uses the signal quality measurement as an additional criterion for computing the plurality of probabilities.

* * * * *